May 4, 1943.  R. MAYNE  2,318,347
TRACK AND DETACHABLE GROUSER THEREFOR
Filed March 1, 1941
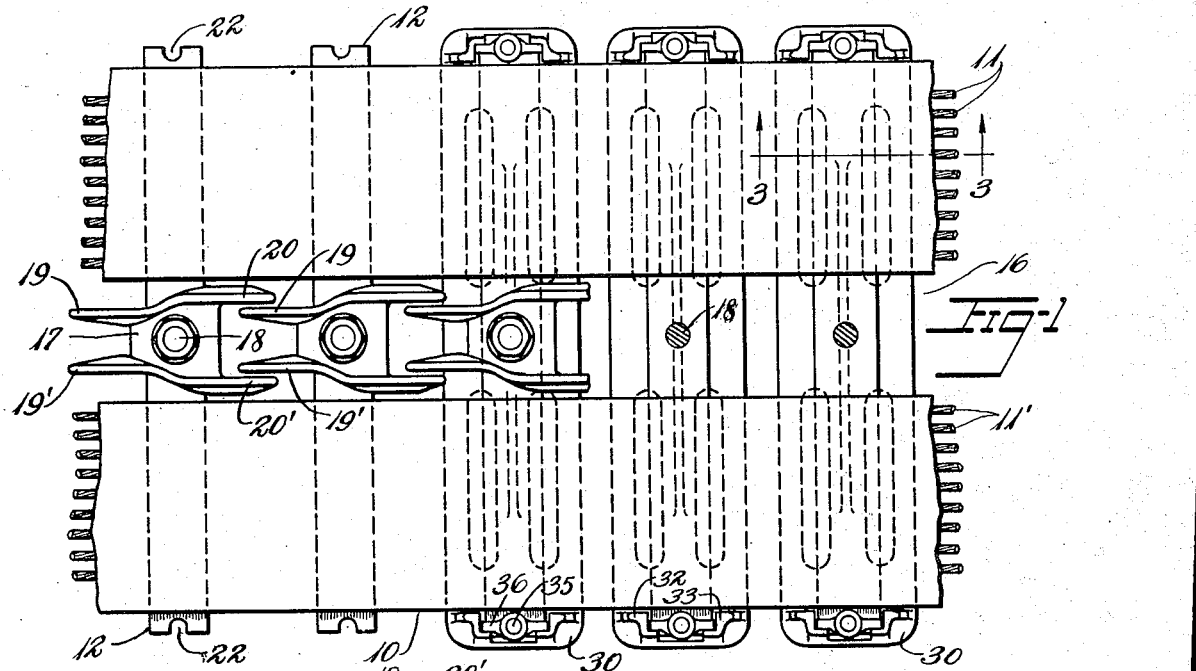
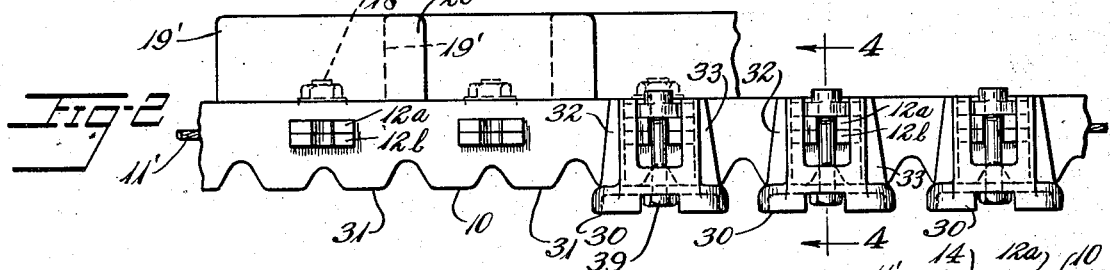
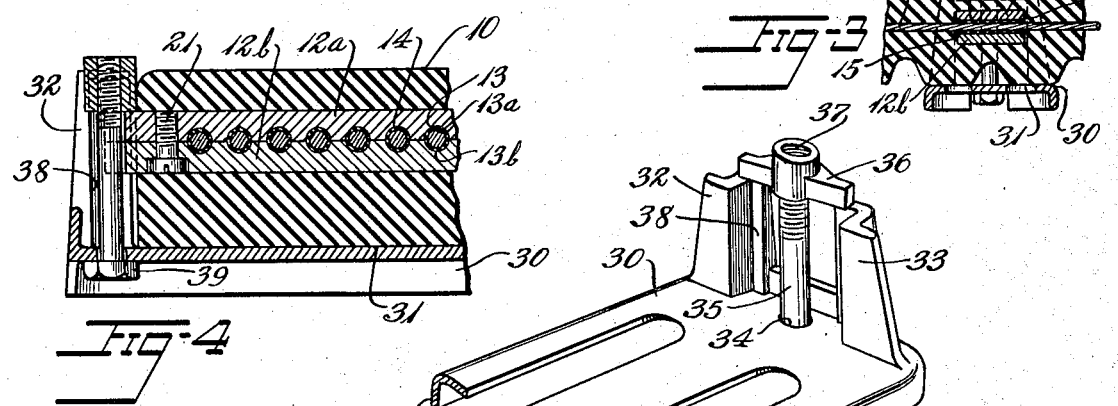

Patented May 4, 1943

2,318,347

UNITED STATES PATENT OFFICE 2,318,347

TRACK AND DETACHABLE GROUSER THEREFOR

Robert Mayne, Akron, Ohio, assignor to The B. F. Goodrich Company, New York, N. Y., a corporation of New York Application March 1, 1941, Serial No. 381,327

9 Claims. (Cl. 305—10)

This invention relates to tracks for self-laying track-type vehicles and to detachable grousers therefor.

In the construction of self-laying track-type vehicles, it has been proposed to provide a track comprising longitudinally extending tension members, such as reaches of metallic cables held in spaced-apart relation by longitudinally spaced-apart driving members, such as metal cross-bars, all embedded in a resilient protective tread body of rubber-like material. Such a construction has provided a tread of rubber-like material for contact with the ground. A tread of rubber-like material, while it has provided good traction on many surfaces, has not always provided sufficient traction on wet soil or on ice. Projecting grousers of metal are sometimes desirable to penetrate the soft soil and ice to provide traction, but the provision of such grousers on tracks having a body of rubber material forming the tread has presented difficulties as it is necessary to provide security of the attachment of the metal parts to the rubber while permitting extensive flexing movement of the track which tends to loosen the grouser and cause it to slip.

The principal objects of the invention are to provide security of attachment of the grouser with ease of removability without interfering with the flexibility of the track, especially where the track is continually flexible, or nearly so, to provide for increasing traction, and to provide simplicity of construction without objectionably increasing the dimensions of the track.

These and other objects will appear from the following description and the accompanying drawing.

Of the drawing:

Fig. 1 is a plan view of the track looking at the wheel-contacting back thereof, parts being broken away and parts shown in section, showing the grousers attached at some of the driving members, others being removed.

Fig. 2 is a side elevation thereof.

Fig. 3 is a cross-sectional detail view taken along line 3—3 of Fig. 1.

Fig. 4 is a cross-sectional view taken along line 4—4 of Fig. 2.

Fig. 5 is a perspective view of one of the grousers, parts being broken away.

In accordance with the invention, the driving members of the track are extended beyond the margins of the rubber tread body and are adapted to inter-engage upstanding lugs formed on the removable metallic grousers and to be engaged by bolts which also engage the grousers and hold them in place. Provision is made for security of attachment despite the presence of the rubber body, and for convenience of assembly and simplicity and strength of the structure.

Referring to the drawing the numeral 10 designates the flexible body of the track comprising a resilient body of rubber-like material. The tension members, in the form of flexible metallic cables are arranged in two spaced-apart groups, each comprising spaced-apart reaches of cables 11, 11', the cables being completely enclosed by the rubber body and being held in spaced relation by longitudinally spaced-apart driving members in the from of cross-bars 12 which are partially embedded in the rubber-like material. Cross-bars 12 are each formed of a pair of bar members 12a, 12b mounted face to face and formed with complementary grooves 13a, 13b defining openings 13 for receiving the cables. The openings 13 are larger than the cables and a cushioning layer 14 of rubber-like material encloses each cable and fills the space between the cable and the opening so as to transmit the load from the cross-bars to the cables by shear loading of the rubber surrounding the cables. The edges of the grooves are rounded as at 15 so as not to cut the rubber when the cables are flexed as when the track passes around the supporting driving wheels and guide wheels. The resilient body 10 is divided longitudinally to provide a clearance space 16 between the groups of cables and the cross-bars extend across this space so as to engage the driving sprockets of the driving wheels.

Hardened wear plates 17 are secured within the space 16 to the cross-bars by bolts 18 passing therethrough which bolts also act to hold the members 12a, 12b of the cross-bars in assembled relation. The wear plates are formed with parallel flanges 19, 19', 20, 20', the flanges 19' being spaced closer than the flanges 20, 20' and the wear plates on the respective cross-bars having their flanges 20, 20ᴬ overlapping flanges 19, 19' of the next wear plate thereby providing against side sway of the track and also providing means for engaging a guiding groove in the wheels over which the track passes for the purpose of guiding the track. The guiding bar elements 12a, 12b are additionally secured to each other by screws 21 near their ends and the bars extend slightly beyond the rubber body of the track at the sides thereof to provide means for securing the grousers thereto. For this purpose the ends of the driving bars are notched as at 22 to interlock with the bolts used for securing the grousers.

The grousers each comprise a metal plate 30 adapted to extend across the tread face 31 of the rubber body of the track and having integral lugs 32, 33 upstanding therefrom in spaced-apart relation at each end of the grouser and adapted to straddle the projecting ends of the cross-bars. The plate 30 is apertured near each end thereof, as at 34, to receive a bolt 35 which extends therethrough and also through the notch 22. A bridge piece 36 has a threaded aperture 37 extending therethrough for engaging the threaded end of the bolt 35 and extends over the notched end of the cross-bar when the grouser is secured to the track, the ends of the bridge piece being confined by a vertical guideway 38 formed in the lugs 32, 33 so as to prevent rotative movement of the bridge piece which has sliding engagement with the guideway. The bolts 35 have polygonal heads 39 which impinge against the plate 30 of the grouser and are adapted to be engaged by a socket wrench for drawing the bridge piece and the grouser toward each other against the cross-bar and the face of the resilient tread body respectively.

The grousers may be formed with projections of any desired shape for entering the soil or for penetrating the surface of ice or other slippery surfaces and these projections in the form illustrated in the drawing comprise downwardly turned margins 40, 41 and a downwardly extending rib 42. These margins extend downwardly a sufficient distance to extend beyond the heads of the bolts 35 and therefore protect the bolts from contact with abrasive surfaces such as stone or concrete. The grousers are preferably formed from heat-treated steel castings and their construction is such that they may be cast without the necessity of machining operations.

The track may be operated on pavements without the grousers and the grousers may be readily attached when the vehicle approaches soft ground, as many as desired of the grousers being attached to the track while the track is in place on the vehicle. In attaching the grousers the plates 30 are placed face to face with the tread body with the lugs 32, 33 straddling the ends of one of the cross-bars. The bridge piece is then placed against the opposite side of the projecting end of the cross-bar with its ends entering the guideway 38 and the bolts 35 are screwed in place with their bodies passing through the notched ends of the cross-bars.

As each grouser engages a cross-bar directly and the cross-bars are resiliently secured to the cables by a cushioning body of rubber under shear loading, the grousers do not interfere with the flexing of the track or of its tension members. Also, the construction is such that the weight of the vehicle upon the grouser is cushioned by the rubber of the tread, the grouser being permitted to yield upwardly while it is effectively restrained in other directions by the engagement of the bridge pieces 36 in the guideways 38.

Variations may be made without departing from the scope of the invention as it is defined by the following claims.

I claim:

1. A track for self-laying track vehicles, said track comprising a resilient tread body of rubber-like material, rigid projections at opposite margins of said body, a grouser at a tread face of said body retained longitudinally of the track by said projections, and additional means engaging said projections for retaining said grouser against the resilient tread face of said body.

2. A track for self-laying track vehicles, said track comprising a resilient tread body of rubber-like material, a rigid member extending therethrough and projecting therefrom at opposite margins thereof, a grouser at a tread face of said body and retained by said projections, said grouser having means thereon to embrace said projections at front and rear and side faces thereof to resist movement of the grouser longitudinally of the track and laterally thereof, and means for holding the grouser against the resilient face of said tread body.

3. A track for a self-laying track vehicle, said track comprising a body of resilient rubber-like material, a driving member partially embedded therein and projecting therefrom at the sides of said body, a grouser seated on the face of said resilient body, and slotted means integral with said grouser for receiving the projecting portions of said driving member, said slotted means permitting removal of the grouser by movement away from the track face.

4. A track for a self-laying track vehicle, said track comprising a body of resilient rubber-like material, a driving member partially embedded therein and projecting therefrom at the sides of said body, a grouser at the face of said resilient body, a pair of lugs on each end of said grouser adapted to embrace a projecting portion of said driving member, and means for clamping said grouser to said driving member.

5. A track for a self-laying track vehicle, said track comprising a body of resilient rubber-like material, a driving member partially embedded therein and projecting therefrom at the sides of said body, a grouser at the face of said resilient body, a pair of lugs on each end of said grouser adapted to embrace a projecting portion of said driving member, and means for retaining said grouser in place about the projecting portions of said driving member, said means comprising bolts engaging in notches formed in said projecting portions, and bridge pieces engaged by said bolts and bearing on said projecting portions.

6. A grouser for a self-laying track, said grouser comprising a ground engaging portion having upstanding projections adapted to embrace the margins of the track and means at said projections for securing the grouser to the track, said upstanding projections comprising spaced apart elements providing a guideway between them, and said securing means comprising a member slidable in said guideway and means for clamping the member upon the margin of the track.

7. A grouser for a self-laying track, said grouser comprising a ground engaging portion having at each side margin thereof a pair of upstanding projections spaced-apart in the longitudinal direction of the track and integral with said portion and adapted to embrace the margins of the track and means comprising an element slidable in the radial direction of the track between said projections for securing the grouser to the track.

8. A grouser for a self-laying track which track has a body of resilient rubber-like material and rigid portions projecting therefrom at the sides of said body, said grouser comprising a body portion, a pair of lugs at each end of said grouser adapted to embrace projecting portions at the margins of said track, and means for retaining the grouser in place about said projecting portions, said means comprising a threaded element at each pair of lugs, and bridge pieces by said elements for bearing upon the projecting portions of the track and embracing the same between said bridge pieces and said lugs.

9. A track for a self-laying track vehicle, said track comprising a body of resilient rubber-like material having a tread face, a member embedded in said material and having elements projecting laterally therebeyond at each side of the track, a grouser adapted to be placed on the tread face of said body when the track is in place on the vehicle, and means for engaging said projecting elements to clamp said grouser to the track in the radial direction, said means including a radially extending retaining element carried by said grouser and removable from the projecting element of the track in the radial direction, and a clamping element movable radially of the track for tensioning said retaining element in a direction radial of the track.

ROBERT MAYNE.